United States Patent [19]

Krause

[11] 4,208,633
[45] Jun. 17, 1980

[54] CURRENT SUPPLY BRANCHING ARRANGEMENT FOR SEPARATION OF SIGNAL AND SUPPLY CURRENTS

[75] Inventor: Heinz Krause, Emmering, Fed. Rep. of Germany

[73] Assignee: Siemens Aktiengesellschaft, Berlin & Munich, Fed. Rep. of Germany

[21] Appl. No.: 916,289

[22] Filed: Jun. 16, 1978

[30] Foreign Application Priority Data

Jun. 30, 1977 [DE] Fed. Rep. of Germany ....... 2729690

[51] Int. Cl.² .............................................. H03F 3/60
[52] U.S. Cl. .................................... 330/56; 330/165; 330/188; 330/195
[58] Field of Search ..................... 330/53, 56, 57, 157, 330/192, 198, 199, 286, 297, 302, 165, 188, 195

[56] References Cited

U.S. PATENT DOCUMENTS

| | | | |
|---|---|---|---|
| 2,256,084 | 9/1941 | Goodale et al. | 330/53 X |
| 4,114,107 | 9/1978 | Bauch et al. | 330/56 |

FOREIGN PATENT DOCUMENTS 1272466 2/1969 Fed. Rep. of Germany.

Primary Examiner—James B. Mullins
Attorney, Agent, or Firm—Hill, Van Santen, Steadman, Chiara & Simpson

[57] ABSTRACT

A current branching circuit for an amplifier for first and second input terminals and a current supply feed terminal comprising a pair of magnetically coupled windings with one of the windings connected between the center conductor of a coaxial feed line and one of the input terminals and the other windings connected between the other input terminals to a capacitor which has its other side connected to the outer conductor of the coaxial line and wherein the pair of leads connecting the pair of windings to the pair of input terminals cross one another. The outer conductor of the coaxial line is connected to the current supply feed terminal through a second capacitor.

8 Claims, 7 Drawing Figures

CURRENT SUPPLY BRANCHING ARRANGEMENT FOR SEPARATION OF SIGNAL AND SUPPLY CURRENTS

BACKGROUND OF THE INVENTION

1. Field of the Invention

This invention relates in general to current supply branching systems for separating signal and supply currents particularly for current supply of remotely fed line amplfiers.

2. Description of the Prior Art

The current supply for D.C. series-fed line amplifiers are known as shown, for example, in German Pat. No. 1,272,466 and such circuits include series connected high and low pass filters which are connected in series in the input and output sides of the line chokes. In such structures as illustrated in applicant's FIGS. 1a and 1b, the high pass coil is in the parallel branch and is connected in parallel to the input of the line choke $D_r$ and is connected in series with a capacitor $C_1$ between the inner and outer conductors of the coaxial feed line. On the output side of the line choke $D_r$ is connected the repeater amplifier circuit V which contains a load resistance $R_V$. At the connection point between the capacitor $C_1$ and the high pass coil $L_1$ one side of a low pass coil $L_2$ is connected and the other side is connected by way of a capacitor $C_2$ to the outer conductor of the input coaxial feed line. The other side of the capacitor $C_2$ is connected to the load resistor $R_V$ of the repeater circuit V.

FIG. 1b illustrates a modified form of the prior art system of FIG. 1a wherein the low pass coil $L_2$ has been incorporated into the winding $L_D$ of a line choke in the arrangement shown. The high pass coil $L_1$ is required in this arrangement for proper operation of the circuit of the prior art.

In these known circuits for current supply branching, the high pass parallel inductance is always necessary for the direct current supply to the load resistor of the amplifier.

SUMMARY OF THE INVENTION

It is an object of the present invention to improve the prior art current supply branching circuits by simplifying it such that the high pass parallel inductor is not required for the direct current supply to the load resistor of the amplifier.

The present invention provides the effect of the prior art devices including high and low pass filters with line chokes which provide a very small resistance to the signal current flowing through both windings in opposite directions but which provide a very high resistance to interfering currents such as parasitic currents flowing through only one of the windings wherein this objective is accomplished according to the invention by providing that the output terminals of the line choke $D_r$ is connected ahead of the line amplifier with the input terminals of the line choke reversed in polarity before connecting to the line amplifier by crossing the leads between the line choke and the line amplifier.

A particularly advantageous result of the invention in addition to decoupling the amplifier input and output also assures that the line choke supplies the direct feed current supply for the amplifiers with the elimination of components required in the prior art.

In current supply branching arrangements in which amplifiers for two way feed are fed in parallel, the cost of the bypass low-pass filter required in each case on one side is reduced by providing in the invention only a single coil.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1B:
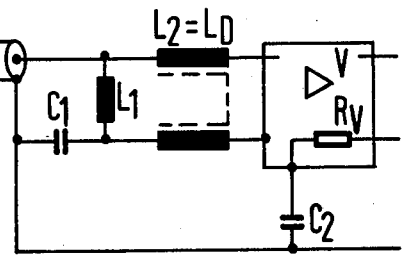
Figure 2:
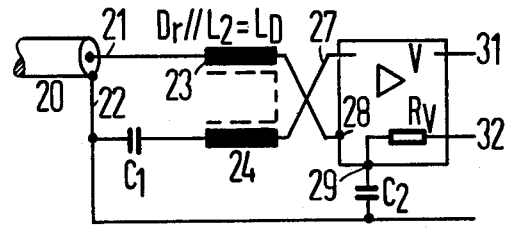
FIG. 2 comprises an embodiment of the invention.

FIG. 2 illustrates an input coaxial line 20 which has an inner conductor 21 and an outer conductor 22. The center conductor 21 is connected to one coil 23 of a line choke. The outer conductor 22 is connected to one side of a capacitor $C_1$ which has its other side connected to the second winding 24 of the coaxial choke. The choke comprising the windings 23 and 24 is also designated as a line choke $D_r$. The output of the line choke is connected to a line amplifier V which has a pair of input terminals 27 and 28 and the output of the choke 23 is connected to the input 28 and the output of the line choke 24 is connected to the input 27. It is to be particularly noted that this varies from the arrangements of the prior art such as illustrated in FIG. 1b in that the outputs of the two line choke coils are reversed when connected to the input of the amplifier V. A capacitor $C_2$ is connected between the outer conductor 22 of the input line 20 and a current supply feed terminal 29 of the amplifier V. The terminal 29 connects to the load resistor $R_V$ which has its other side connected to output terminal 32 of the line amplifier. The other output terminal of the amplifier is designated by numeral 31. It is to be realized, of course, that the line amplifiers are bilateral and the designation of input and output lines is used only for purposes of convenience as of course at times the signals pass in the opposite direction through the line amplifiers.

Figure 1A:
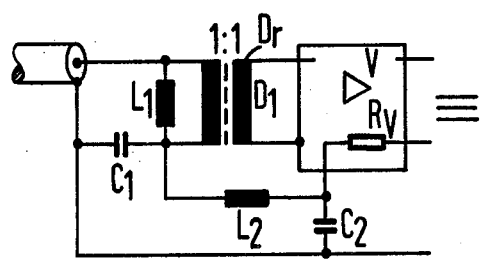
FIGS. 1a and 1b illustrate prior art current supply branching arrangements.

It is to be noted that in the invention illustrated in FIG. 2 that the high pass coils $L_1$ required in prior art such as illustrated in FIGS. 1a and 1b are eliminated. In the circuit of the invention the winding of the line choke $D_r$ which is designated in FIG. 2 with the symbol $L_D$ provides not only the function of the low pass coil $L_2$ but also the function of the high pass coil $L_1$ of the circuit illustrated in FIGS. 1a and 1b.

In the circuit of FIG. 2, the line choke $D_r$ provides on the one hand a characteristic in the transmission path which acts like a wide band line transformer which has a negligible influence on the useful signal because the opposed ends of the windings of the line choke windings are at the same HF potential whereas on the other hand, the line choke provides a large inductive reactance for interference currents such as parasitic currents from the amplifier input to the amplifier output.

Figure 3:
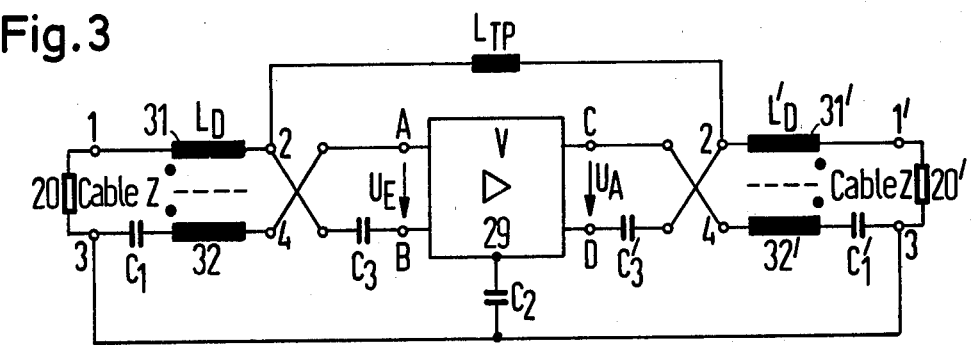
FIG. 3 illustrates a further sample embodiment with the feed current supplied passed an amplifier fed from the opposite direction.
Figure 4:
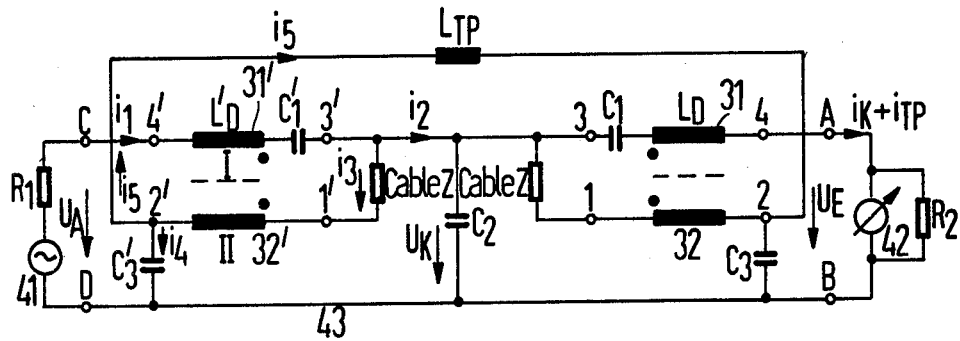
FIG. 4 illustrates a modified form of the invention.
Figure 5:
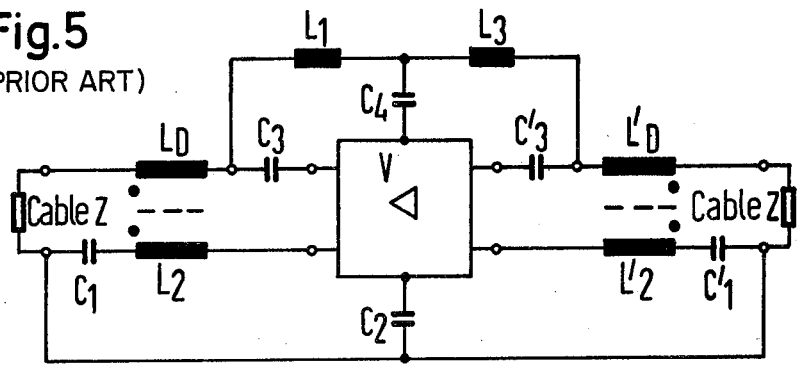
FIG. 5 illustrates prior art to the invention.

A further circuit according to the invention which is illustrated in FIGS. 3 and 4 results when in an arrangement according to FIG. 5, the load resistors of the amplifiers of the bilateral circuit are in parallel and the direct current is supplied on one side past the amplifier. FIG. 5 illustrates a current supply branching derived from the circuit according to FIG. 1 with a feed current bypass. An additional low pass coil is required in this form of arrangement which includes at least a high voltage impedance capacitor $C_4$ and two coils $L_1$ and $L_3$. FIGS. 3 and 4 illustrate the method of converting the circuit of FIG. 5 so as to utilize the inventive concept of the present invention and the capacitor $C_4$ and coils $L_1$ and $L_3$ are replaced with a single coil $L_{TP}$ as illustrated in FIG. 3. This is possible since at the input and output sides of the amplifier V two high-pass capacitors $C_3$ and $C'_3$ are connected to the amplifier and maintain the direct current remote from the amplfier reference voltage and are used as a low pass capacitor. In detail, as illustrated in FIG. 3, the cable impedance of the cable 20 between the terminals 1 and 3 is schematically represented and terminal 1 illustrates the connection of the inner cable conductor and terminal 3 represents the outer conductor. The inner conductor 1 is connected to the first winding 31 of the line choke $L_D$ which has its other side connected to terminal 2 which is connected through a capacitor $C_3$ to the input terminal B of the line amplifier V. The outer conductor 3 of the cable 20 is connected to a capacitor $C_1$ which has its other side connected to winding 32 of the line choke $L_D$ and the other side of winding 32 is connected to terminal 4 which is connected to input terminal A of the line amplifier V. It is to be particularly noted that the outputs of the line choke at windings 31 and 32 are crossed before being supplied to the input terminals of the amplifier V. It is to be particularly noted that the capacitor $C_3$ is connected between terminal 2 and B. Terminal B comprises the reference potential input to the amplifier. The terminal 2 at the output of winding 31 of the line choke $L_D$ is also connected to one side of a coil $L_{TP}$ which has its other side connected to the connection point 2' of a winding 31' of the other line choke $L'_D$. On the output side of the amplifier at terminals C and D there is provided a circuit arrangement analogous to the input side wherein the terminal C is crossed over to the terminal 4' of winding 32' of the line choke $L'_D$. The terminal D of the line amplifier V is connected to a capacitor $C'_3$ and the line crossed over to terminal 2' of the winding 31' of the choke $L'_D$. The center conductor 1' of the cable 20' is connected to the second side of the winding 31' and the outer conductor 3' of the cable 20' is connected to a capacitor $C'_1$ which has its other side connected to the winding 32'. The outer conductor 3' is also connected to the outer conductor 3 of the input cable 20. A capacitor $C_2$ is connected between the outer conductors 3 and 3' and the direct current feed point 29 of the amplifier V. FIG. 4 comprises a transformed circuit diagram of the circuit of FIG. 3 and the reference symbol illustrated in FIG. 3 are used to designate identical circuit elements in the equivalent circuit of FIG. 4. The output terminals C and D of the amplifier V shown in FIG. 3 have a output voltage $U_A$ across them which is illustrated adjacent the left edge of FIG. 4 and these terminals are connected by way of the series connection of a generator 41 and a resistor $R_1$. The input terminals A and B of the amplifier V between which the input voltage $U_E$ is present are illustrated on the right portion of FIG. 4 and are connected in parallel with a measuring device 42 which has an internal resistance $R_2$. The output terminal D is connected to the input terminal B of the amplifier through a continuous line 43. The output terminal C is connected to the input terminal C of the amplifier by way of a series branch which as illustrated in FIG. 4 in the direction from the output terminal C to the input terminal A includes the switching point 4', the winding $L'_D$ of the line choke, the capacitor $C'_1$, the terminal $C'$, the terminal C, the capacitor $C_1$, the winding $L_D$ and the terminal 4. A capacitor $C_2$ is connected between the junction point between the terminals 3 and 3' terminals B and D. The cable impedance is connected from terminal 3' to terminal 1' and to one terminal of winding 32' of the line amplifier $L'_D$ which has its other side connected through a capacitor $C'_3$ to terminal D. The capacitor $C'_3$ is also connected to one side of the choke $L_{TP}$ which has its other side connected to terminal 2. A capacitor $C_3$ is connected between terminal 2 and terminal B and winding 32 of the line amplifier $L_D$ is connected between terminal 2 and terminal 1. The cable impedance Z is connected between terminals 1 and 3.

For initial consideration, the circuit of FIG. 4 can be examined without considering the direct current bypass inductor $L_{TP}$. When a voltage $U_A$ is applied between points C and D, the current $i_1$ flows which splits up into currents $i_2$ and $i_3$ at a finite choke inductance $L'_D$ at point 3' with $i_2$ essentially flowing back to the source by way of capacitor $C_2$ and with $i_3$ flowing back to the source by way of choke winding 32' and the capacitor $C'_3$. The current $i_2$ which is substantially smaller in the transmission region than the current $i_3$ produces at capacitors $C_2$ a voltage $U_K$ which is analogous to the previously described coupling paths and results in a current $i_k$ which represents a voltage $U_E$ at the input of the amplifier.

In the transmission region, therefore, essentially the low-pass T arrangement comprising the coils $L'_D$, $C_2$, and $L_D$ provides for the circulation attenuation ratio of $U_A/U_E$. The inductances $L_D$ are respectively $L_D'$ become completely effective in this low-pass path since the current $i_2$ flowing through the choke winding 31' and leading to the coupling has no compensating counter current in the winding 32'. The high pass capacitors $C_1$, $C_1'$ and $C_3$, and $C'_3$ contribute substantially to the circulation attenuation only below the transmission region.

Thus, by means of the direct current bypass coil $L_{TP}$, a further coupling path is obtained which is due to the splitting up of the current $i_3$ and to the currents $i_4$ and $i_5$ with $i_5$ being much less than $i_4$.

The largest portion of current $i_3$ flows in the transmission region by way of the high pass capacitor $C_3$ back to the source as current $i_4$. Additionally, the largest part of the current $i_5$ is also fed back by way of capacitor $C_3$ so that only the relatively small coupling current $i_{TP}$ reaches the input of the amplifier. By means of the coil $L_{TP}$, a low pass $\pi$ element parallel to the low-pass T element is provided which includes the elements $C_3$, $L_{TP}$ and $C'_3$. The windings $L_D$ or $L'_D$ do not contribute to the low-pass attenuation of the second path since even in the case where $L'_D$ is equal to infinity and $i_2$ is equal to 0, the currents $i_4$ and $i_5$ will continue to exist.

By selecting the elements $L_D$, $L'_D$, $L_{TP}$ and $C_3$ and $C'_3$ while considering the parasitic effects, allows sufficiently large values to be achieved for the circulation attenuation as required.

Figure 6:
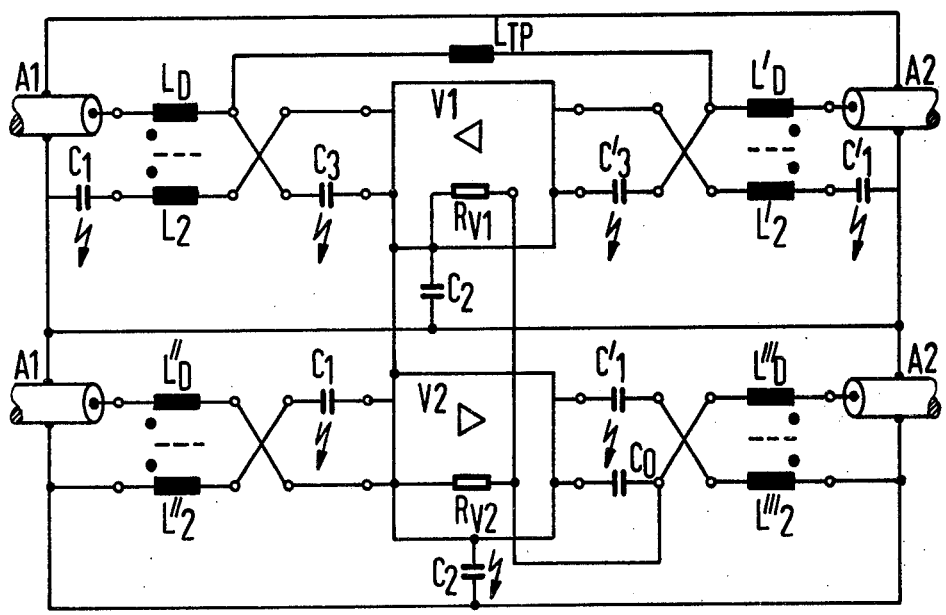
FIG. 6 is a sample embodiment of the invention for direct current series feed with parallel connected load resistors of the amplifiers.

FIG. 6 illustrates a further sample embodiment of a current supply branching arrangement wherein the direct current series feed and the parallel connected load resistors $R_{V1}$ and $R_{V2}$ of the amplifiers $V_1$ and $V_2$ are operated in opposite directions. The supply current branching circuit section associated with amplifier $V_1$ corresponds to the current supply branching circuit for supplying the feed current pass the amplifier according to FIG. 3 which is fed from the opposite direction. The current supply branching circuit section associated with amplifier $V_2$ also contains at the input side a line choke $L''_D$ which has its input side connected to the inner conductor of the coaxial cable A1. The other side of the line choke $L''_D$ is connected to the reference potentials of amplifiers $V_1$ and $V_2$. The other winding $L''_2$ of the input side line choke is connected on one side to the outer conductor of the coaxial cables A1 and A2 and on the other side by way of a high voltage resistant capacitor $C_1$ to the input of amplifier $V_2$. In each instance, the leads from the line chokes are inverted between the line choke and the respective amplifier connections. At the outputs of the amplifier $V_2$, a circuit arrangement constructed analogous to the input wherein the circuit elements equivalent to the input are provided in mirror image as shown. Between the amplifier reference potential and the winding $L'''_D$, an additional blocking capacitor $C_O$ is connected with its other side connected to the output terminal of the amplifier. The side of the capacitor $C_O$ facing the winding $L'''_D$ is connected to the parallel connected load resistors $R_{V1}$ and $R_{V2}$ of the amplifiers $V_2$ and $V_1$ as shown.

Figure 7:
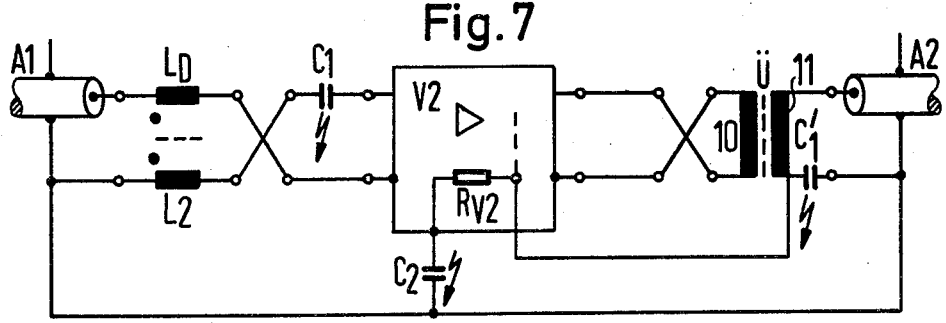
FIG. 7 illustrates a further embodiment which includes an output side parallel transformer.

FIG. 7 illustrates a further embodiment illustrating the direction of branching according to FIG. 6. A potential exchanged series choke is provided at the input of amplifier $V_2$ the potential exchanging series choke which according to the arrangement of FIG. 6 is at the output side behind the amplifier $V_2$ is replaced by a line transverse transformer Ü whose windings ends facing the amplifier $V_2$ are crossed before connecting to the amplifier $V_2$ and, thus, in turn effect an exchange of the polarity of the potential. The other winding of the transformer Ü is connected at one end to the inner conductor of the output side coaxial cable A2 and on the other side to the load resistors $R_{V2}$ and $R_{V1}$ of the amplifiers $V_1$ and $V_2$ as well as through a high voltage impedance capacitor $C'_1$ to the outer conductors of both of the coaxial cables A1 and A2. The special advantage of this variation of the invention lies in the fact that the usual blocking capacitor $C_O$ shown in FIG. 6 which is in series with a high pass coil and through which the feed voltage of the individual amplifier is applied can be eliminated. Furthermore, the amplifier output which can be destroyed by voltages as, for example, by lightning discharges is better protected by the transverse transformer since with a very high current the inductance of the transformer largely disappears which prevents the transfer of energy from lightning from being applied to the amplifier output. The decoupling of amplifier input and output at high frequencies must largely be taken over here by the input side longitudinal choke in conjunction with the high voltage resistant low pass capacitor $C_2$.

The chokes or transformers used in the current supply branching according to the invention, on which chokes or transformers in particular high voltage requirements are required are expediently realized as two-wire transformers with windings consisting of one Teflon-insulated and one lacquer-insulated copper wire 5.

Although the invention has been described with respect to preferred embodiments, it is not to be so limited as changes and modifications can be made which are within the full intended scope of the invention as defined by the appended claims.

I claim as my invention:

1. A current supply branching circuit for an amplifier having first and second input terminals fed by a coaxial cable having inner and outer conductors and for the separation of a signal current and a supply current, particularly for the power supply of a remotely-fed line amplifier which contains series-connected high pass filters and low pass filters as well as at least one line choke comprising two magnetically coupled windings with first ends connected to said coaxial cable which provide a very low resistance to the signal current flowing through said two windings in opposite directions, in that the second ends of said two windings (23, 24) of the line chokes ($D_r$) are connected to said first and second input terminals of said amplifier (V) by a pair of leads which cross one another.

2. A current supply branching circuit according to claim 1 including a first capacitor connected between the first end of one of said two windings and the outer conductors of said coaxial cable.

3. A current supply branching circuit according to claim 2 wherein said line amplifier has a current supply feed terminal and including a second capacitor connected between said current supply feed terminal and the outer conductor of said coaxial cable.

4. A current supply branching arrangement according to claim 1 wherein in said line choke is a two-wire transformer with a winding formed of lacquer-insulated copper wire and a winding formed of Teflon-insulated copper wire.

5. A current supply arrangement for a line amplifier having a pair of input terminals and a pair of output terminals and a current supply feed terminal comprising, a first coaxial line with inner and outer conductors, a line choke with first and second windings, one end of said first winding connected to said inner conductor, a first capacitor connected between the outer conductor and the first end of said second winding, a second capacitor connected between said outer conductor and said current supply feed terminal of said line amplifier and the second ends of said first and second windings respectively connected to said pair of input terminals of said line amplifier by a pair of leads which cross one another.

6. A current supply arrangement for a line amplifier according to claim 5 further including a third capacitor connected between said second end of said first winding and one of said pair of input terminals of said line amplifier, a second coaxial line with inner and outer conductors and its outer conductor connected to the outer conductor of said first coaxial line, a second line choke with third and fourth windings, the first end of said third winding connected to the inner conductor of said second coaxial line, a fourth capacitor connected between the second end of said third winding and one of said output terminals of said line amplifier, a fifth capacitor connected between the outer conductor of said second coaxial line and the first end of said fourth winding, the second end of said fourth winding connected to a second one of said pair of output terminals of said line amplifier and a second pair of leads which cross another connecting the second ends of said third and fourth windings to said one of said output terminals and said fourth capacitor, and an additional inductor connected between the second ends of said first and third windings.

7. A current supply arrangement according to claim 5 including said line amplifier and a second line amplifier having their load resistors connected together.

8. A current supply arrangement for a line amplifier having a pair of input terminals and a pair of output terminals, first and second coaxial lines having inner and outer lines with their outer lines connected together, a first line choke with first and second windings with the first end of said first winding connected to the inner conductor of said first coaxial line, the second end of said first winding connected to one of said pair of input terminals of said line amplifier, a first end of said second winding connected to the outer conductor of said first coaxial line, a first capacitor connected between the second end of said second winding and the other one of said pair of input terminals of said line amplifier, a pair of current supply feed terminals on said line amplifier, a second capacitor connected between said outer conductor of said first coaxial line and one of said pair of current supply feed terminals of said line amplifier, a transformer with third and fourth windings with first and second ends of said third winding connected respectively to said pair of output terminals of said line amplifier, a first end of said fourth winding connected to the inner conductor of said second coaxial line and the second end connected to the other one of said pair of current supply terminals of said line amplifier, a third capacitor connected between said second end of said fourth winding and the outer conductor of said second coaxial line and a first pair of leads which cross each other connecting said first and second windings to said first capacitor and said one of said pair of input terminals, and a second pair of leads which cross each other connecting said first and second ends of said third winding to said pair of output terminals and said second current supply terminal connected to the second end of said fourth winding.

* * * * *